United States Patent [19]
Wollar et al.

[11] Patent Number: 5,078,561
[45] Date of Patent: Jan. 7, 1992

[54] PLASTIC EXPANSION NUT

[75] Inventors: Burnell Wollar, Barrington, Ill.; Richard J. Schwind, Overland Park, Kans.

[73] Assignee: Illinois Tools Works, Inc., Glenview, Ill.

[21] Appl. No.: 610,687

[22] Filed: Nov. 8, 1990

[51] Int. Cl.$^5$ .............................................. F16B 13/04
[52] U.S. Cl. ........................................ 411/38; 411/59
[58] Field of Search ...................... 411/38, 37, 39, 182, 411/34, 57, 59, 908, 71

[56] References Cited

U.S. PATENT DOCUMENTS

| | | | |
|---|---|---|---|
| 2,343,143 | 2/1944 | Gill | 411/38 |
| 2,887,926 | 5/1959 | Edwards | 411/38 |
| 3,143,916 | 8/1964 | Rice | 411/37 |
| 3,213,746 | 10/1965 | Dwyer . | |
| 3,313,083 | 4/1967 | Flora | 411/38 X |
| 3,342,098 | 9/1967 | Schuplin . | |
| 3,478,395 | 11/1969 | Flora . | |
| 3,601,869 | 8/1971 | Flora et al. | 411/38 |
| 4,740,123 | 4/1988 | Wollar et al. | 411/38 |
| 4,752,168 | 6/1988 | Richter | 411/38 |
| 4,762,450 | 8/1988 | Schwind et al. | 411/34 |
| 4,776,737 | 10/1988 | Wollar | 411/38 |

FOREIGN PATENT DOCUMENTS

| | | | |
|---|---|---|---|
| 994134 | 4/1975 | Canada | 411/38 |
| 1210351 | 3/1960 | France | 411/38 |

Primary Examiner—Rodney M. Lindsey
Attorney, Agent, or Firm—Nilles & Nilles

[57] ABSTRACT

A universally self-aligned expandable nut including a head and a body moldable in a simple mold having a straight-line open and close action. The head includes an enlarged flange having a central opening through which a screw can pass. The body includes a shank connected to the flange having individual upper walls separated by axially extending upper slots and inner and outer surfaces parallel to a longitudinal axis defining a shank cavity. The upper walls have distal ends establishing a first fold line. The body also has individual tapered wall sections separated by axially extending lower slots aligned with the upper slots. The tapered walls each have an upper end connected to the distal end of an adjacent upper wall section, a lower end, and an inner surface that coacts with inner surfaces of adjacent lower walls to define a lower cavity. The lower wall inner surfaces terminate at a medial portion between the upper and lower ends establishing a second fold line. A tubular member extends upward into the lower cavity and has uninterrupted interior and exterior wall surfaces extending parallel to the longitudinal axis to define a first bore axially aligned with the central opening. The body further includes an insertion and extending axially away from the lower end, uninterrupted outside and inside wall surfaces extending parallel to the body axis and a second bore aligned with the first bore.

12 Claims, 3 Drawing Sheets

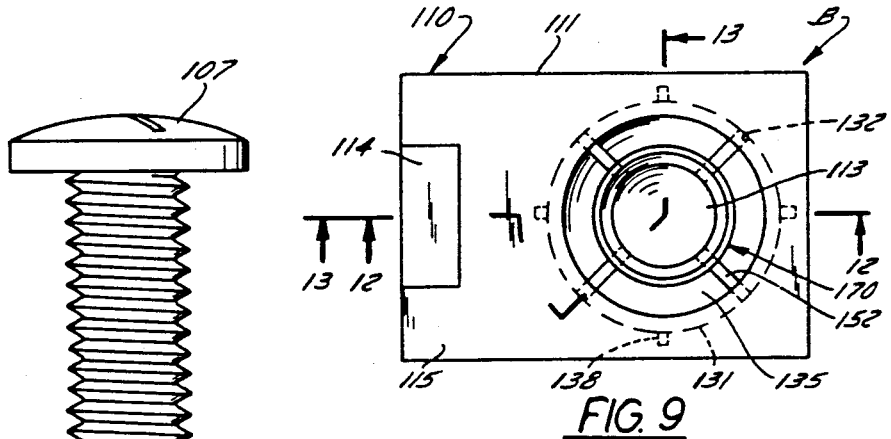
FIG. 9
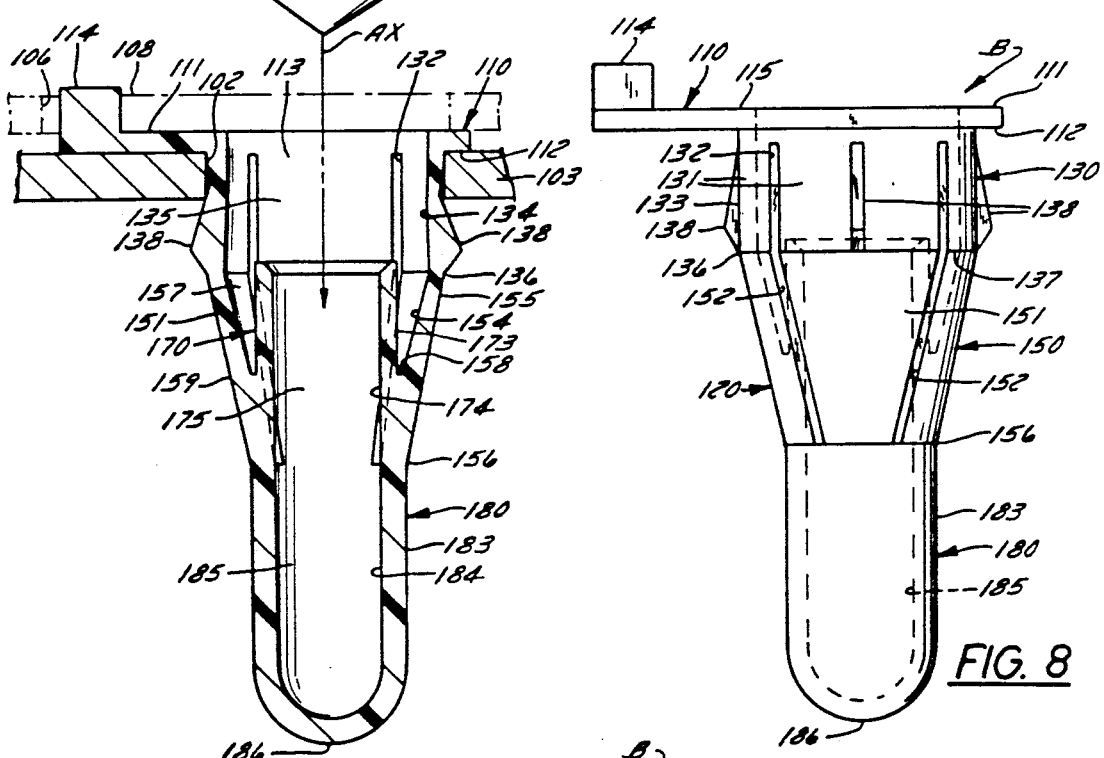
FIG. 12
FIG. 8
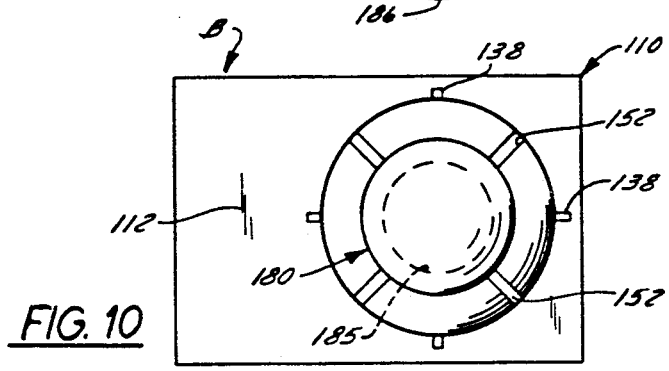
FIG. 10

PLASTIC EXPANSION NUT

FIELD OF THE INVENTION

This invention relates to expansion nuts and more particularly to a one-piece plastic expansion nut of the type that can be molded in a simple straight-line open and close mold.

DESCRIPTION OF THE PRIOR ART

The prior art discloses many different types of plastic expansion nuts which generally comprise a head, and a body that includes a shank and outwardly expandable walls. The body also has an insertion end opposite the nut head insertable through a hole in a single panel member or aligned holes or intersecting slots in two overlaid panel members. The nut head and body is provided with a screw receiving bore opening through the nut head for receiving the threaded portion of a screw inserted into the bore. Rotation of the screw with the screw head engaging the head of the expansion nut draws the insertion end toward the nut head and effects outward expansion of the shank walls to trap the panel or panels between the head and the walls of the nut. It is known to make the body round or rectangular in section. The preferred designs of expansion nuts use more than two collapsible walls or legs so that the nut will universally self-align no matter what its orientation when inserted in a rectangular opening defined by two overlying slots. A nut of this design will be referred to as a universally self-aligning nut. The reason a universal self-aligning nut is desirable is that when the expansion nut body has only two oppositely facing walls and is to be installed in two overlying panels, the installer must take the time necessary to orientate the nut as it is installed so that the walls, as they collapse, will contact the panel farthest from the screw head to lock the nut in place. If the walls collapse into the slot, the nut will remain in place but will not function to hold the two panels together.

While such plastic expansion nuts themselves look deceptively simple, their design and manufacture involves a highly sophisticated technical complexity. Literally hundreds of millions of such expansion nuts are produced annually for use in automobiles and a wide range of other products. Because such enormous quantities of expansion nuts are produced, the market attracts many suppliers and is highly price competitive. A wide variety of designs has been suggested during the last 25 years in an effort to reduce manufacturing costs without reducing convenience of application and gripping effectiveness.

Typical examples of various types of expansion nuts are shown in the following U.S. Pat. Nos.: 3,213,746 issued to J. E. Dwyer on Oct. 26, 1965; 3,313,083 issued to L. H. Flora on Apr. 11, 1967; 3,342,098 issued to J. T. Schuplin on Sept. 19, 1967; 3,478,395 issued to L. H. Flora on Nov. 18, 1969; 3,601,869 issued to L. H. Flora on Aug. 31, 1971; 4,740,123 issued to B. Wollar et al on Apr. 26, 1988; 4,762,450 issued to R. J. Schwind et al on Aug. 9, 1988; and 4,776,737 issued to B. Wollar on Oct. 11, 1988.

In order to manufacture such expansion nuts, high speed injection molds have been designed having as many as 32 and 64 individual mold cavities, all of which can be simultaneously injected with plastic to reduce production time and consequently the net cost required to produce each individual expansion nut. The molds for producing expansion nuts fall into two general types: a straight-line mold having a simple straight-line open and close action; and a compound mold having the straight-line open and close action and, in addition, a side or lateral release action. Compound molds with lateral release action are extremely expensive to produce but their use is necessitated by the complexity of the design of present expansion nuts. Prior art universally self-aligning expansion nuts must be produced on a compound mold designed to have side or lateral mold release action as well as straight-line open and close release action.

The use of compound molds with side release action would appear at first thought to offer n serious disadvantages other than their high cost. However, in fact, compound molds present other long recognized but unsolved problems that increase production costs by significant amounts. For example, 64 mold cavities can only be provided in a simple straight-line mold because a 64 cavity compound mold having lateral release action cannot be operated in conventional molding machines presently in use. This means that a compound mold can only have 32 cavities with the consequence that the molding machine output of 32 expansion nuts from each operating cycle is one-half of what would be produced if a simple 64 cavity straight-line mold could be used. Another long known serious problem is that a compound mold having lateral release action requires an operating cycle time that is at least 20% longer than that of a simple mold.

In summary, present expansion nut designs require the use of a compound mold which cuts the production output of each mold cycle by one-half, while also requiring a 20% longer production cycle time. If a universal self-aligning expansion nut were available that could be produced on a simple straight-line mold, the number of nuts produced with each molding cycle could be increased by 100% and in addition, the mold cycle time could also be reduced by at least 20%. These potential cost savings have been long known, but the historic fact is that no one has known how to design a universally self-aligning expansion nut that can be produced using a simple mold. Present designs require the use of a compound mold requiring lateral release action.

SUMMARY OF THE INVENTION

The object of the present invention is to provide an expansion nut of the universally self-aligning type that will provide gripping effectiveness, convenience of application, and can be produced in a simple straight-line open and close mold.

In accordance with the present invention, there is provided an expansion nut comprising a head and a body. The head includes an enlarged flange having an inner surface for engaging said panel and a central opening through which a screw can pass when the nut is in use. The body includes a shank connected to the flange comprised of a plurality of individual upper walls separated by axially extending upper slots. The upper walls have inner and outer surfaces parallel to the body axis defining a shank cavity with each of said upper walls having a distal end remote from said flange that establishes a first fold line. The body also has a tapered portion composed of a plurality of individual tapered wall sections separated by axially extending lower slots each of which is aligned with a corresponding one of said upper slots. Each of the tapered walls has an upper end connected to the distal end of an adjacent upper wall section, a lower end, and an inner surface that coacts with inner surfaces of adjacent lower walls to define a lower cavity. The lower wall inner surfaces terminate at a medial portion in the lower cavity between the upper and lower ends that establishes a second fold line. A tubular member extends upward into said lower cavity from the medial portion and has uninterrupted interior and exterior wall surfaces extending parallel to the body axis to define an axially extending first bore axially aligned with the central opening. The body further includes an insertion end extending axially away from the lower end and has uninterrupted outside and inside wall surfaces extending parallel to the body axis. The inside wall defines a second bore axially aligned with said first bore and the central opening.

Preferably the tubular member will extend from the medial portion toward said head and terminate at the distal end first fold line of the shank. The shank will comprise four wall sections in spaced surrounding relation to said tubular member. The tubular member exterior wall surfaces and the tapered wall inner surfaces define a cone shaped recess having an apex at the second fold line of the medial portion. The shank can be square or circular in cross section relative to said axis. The shank may comprise upper and lower segments with the upper segment being square in cross section and the lower segment being circular in cross section.

The upper surface of the flange opposite the shank can be provided with an antirotation member that projects axially away from the upper surface.

All of the components of the nut and their surfaces are oriented so that the nut may be injected on a simple straight-line open and close mold.

BRIEF DESCRIPTION OF THE DRAWINGS

Referring to the drawings:

FIG. 8 is a side elevation view of a second embodiment of the expansion nut;

FIG. 9 is a top view of the nut shown in FIG. 8;

FIG. 10 is a bottom view of the nut shown in FIG. 8;

FIG. 12 is a sectional view taken along line 12—12 of FIG. 9;

DESCRIPTION OF THE PREFERRED EMBODIMENTS

Figure 6:
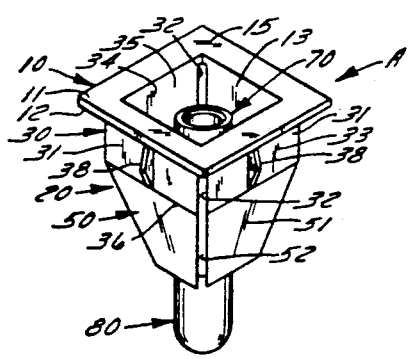
FIG. 6 is an isometric projection view of the nut shown in FIG. 1.
Figure 2:
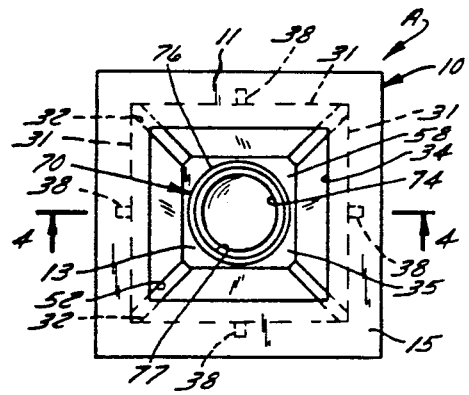
FIG. 2 is a top view of the nut shown in FIG. 1.

Three preferred embodiments of the expansion nut are shown in the drawings and they will be generally identified by reference characters A, B and C respectively. The first embodiment is shown in FIGS. 1–7 and will now be described. Expansion nut A comprises a head 10 and an axially extending body 20. The nut A is adapted to be mounted in a square opening 2 of a single primary panel 3 or in a square opening 2 defined by aligned slots 6 in an outer primary panel 3 overlaid on inner secondary panel 4 as appears in FIG. 7. The nut is adapted to receive a self-tapping screw 7 as shown in FIG. 5 and any accessory element can be secured to the panel by passing the self-tapping screw 7 through a suitable aperture in the accessory and then into the expansion nut A.

The head 10 of the expansion nut includes an enlarged square flange 11 having an inner surface 12 adapted to engage the outer surface of the panel 3. The flange has a flat upper surface 15 and a central opening 13 therethrough for receiving the screw 7 when the nut is installed and in use.

Figure 4:
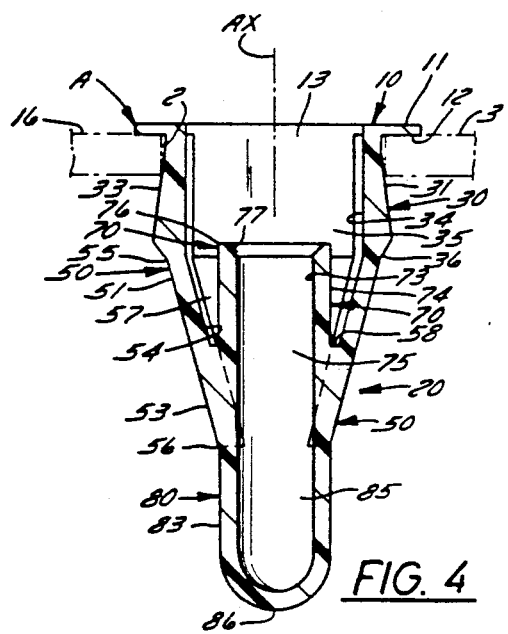
FIG. 4 is a sectional view taken along line 4—4 of FIG. 2.
Figure 1:
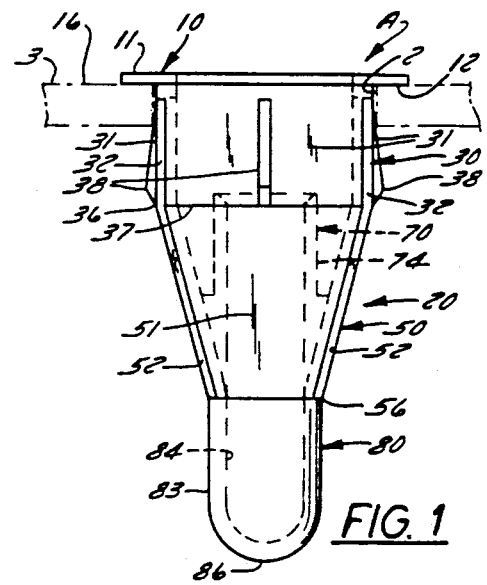
FIG. 1 is a side elevation view of a first embodiment of the expansion nut embodying the invention.
Figure 5:
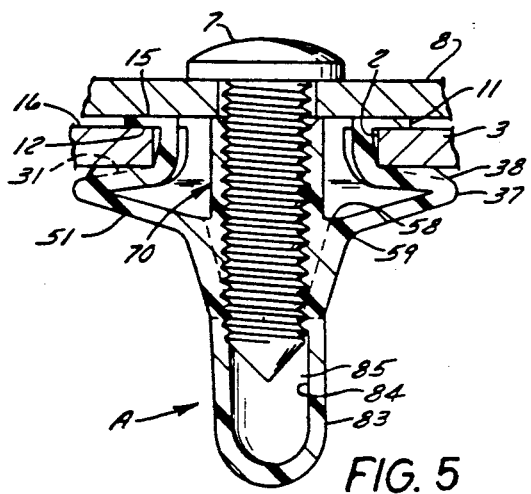
FIG. 5 is a sectional view similar to FIG. 4 but showing the nut in a finally installed position in a panel.
Figure 3:
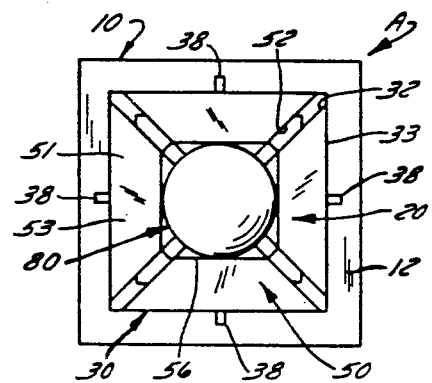
FIG. 3 is a bottom view of the nut shown in FIG. 1.

The body 20 extends axially away from flange 11 and has an axis AX as shown in FIG. 4. The body includes a shank portion 30, a tapered portion 50, a tubular member 70 and an insertion end 80 which will now be described.

The shank 30 includes a plurality of upper wall sections 31 separated by axially extending upper slots 32. The upper wall sections each have outer and inner surfaces 33 and 34 extending parallel to the axis AX. As best shown in FIGS. 4 and 6, the upper wall sections coact to define a shank cavity 35. Each of the upper wall sections 31 have a distal end 36 remote from the flange 11. Distal ends 36 of each of the upper wall sections establish a first fold line 37 which best appears in FIG. 5. If desired, the shank may also be provided with crush ribs 38 which are tapered and extend parallel to the axis AX. The shank 30 as shown in the first embodiment A is square in cross section.

The body 20 also includes a tapered portion 50 composed of a plurality of individual tapered wall sections 51 separated from each other by axially extending lower slots 52, each of which is in alignment with a corresponding one of the upper slots 32. Each of the tapered wall sections 51 has an upper end 55 connected to the distal end 36 of an adjacent upper wall section 31. Each of the tapered wall sections 51 also has a lower end 56, an outer surface 53, and an inner surface 54. The inner surfaces 54 of adjacent lower wall sections coact with each other to define a lower cavity 57. The lower wall inner surfaces 54 terminate at a medial portion 58 in the lower cavity which is located between the upper and lower ends of the tapered portion. The medial portion of the lower cavity establishes a second fold line 59, best seen in FIG. 5.

The body 20 further includes a tubular member 70 which extends upward into the lower cavity 57 from the medial portion 58. Preferably the tubular member 70 will terminate at the distal end first fold line 37 of the shank 30. The tubular member 70 has uninterrupted interior and exterior wall surfaces 73 and 74 extending parallel to the axis AX without transverse cavities and walls of the type that would require a lateral release mold action. The interior wall surface 73 defines an axially extending first bore 75 which is axially aligned with the central opening 13. As best shown in FIG. 4, the tapered wall inner surfaces and tubular member exterior wall surfaces 74 define a pyramid shaped lower cavity having a circular apex at the second fold line 59 of the medial portion 58. Preferably the freestanding end 76 of tubular member 70 is chamfered, as shown at 77, to facilitate the threading of the screw 7 therein. The lower slots 52 in the tapered portion extend downward past the tubular member 70 to the lower end 56 of the tapered portion. If desired, the lower slots 56 could terminate at the medial portion 58 adjacent the lower end of the tubular member 70.

The body 20 further includes an insertion end 80 which is integral with and extends axially away from the lower end 56 of the tapered portion 50. The insertion end 80 has uninterrupted outside and inside wall surfaces 83 and 84 extending parallel to the axis AX. The inside wall surface 84 defines a second bore 85 which is axially aligned with the first bore 75 and the central opening 13. The terminal end 86 is enclosed and preferably semispherical in shape to shield the sharp end of screw 7 and to prevent its contact with electrical wires or with persons. If desired, the terminal end could be open.

Figure 7:
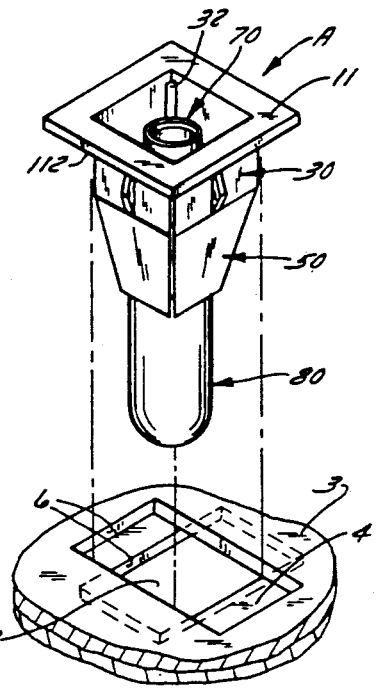
FIG. 7 is an isometric projection view of the expansion nut in aligned relation preparatory to installation in a panel.

The nut of the first embodiment, as just described, may be inserted in either an opening 2 in a single panel, as shown in FIG. 5, or in an opening 2 defined by intersecting slots of a pair of outer and inner panels 3, 4, as shown in FIG. 7. To install the nut A, the body 20 is fully inserted into the aperture 2 until the inner surface 12 of the flange 11 contacts the outer surface 16 of the panel 3 (FIG. 5). The self-tapping screw 7 is axially inserted through an opening in an accessory element, such as a bracket 8, through the central opening 13 and into the aligned first and second bores 75, 85. The screw 7 is then rotated and as it is self-tapping it creates its own threads within the inner surfaces 74 and 84. As rotation continues, the head of screw 7 will contact the outer surface of bracket element 8 after which the insertion end 80 will be drawn toward the panel 3. The wall sections 31, 51 will fold along fold lines 37 and 59, as shown in FIG. 5, thus expanding the walls outward until the upper wall sections 31 are in clamping abutting relationship with the underside surface of the panel 3. The nut A is universally self-aligning. Even when installed in an opening 2 created by overlapping slots, as shown in FIG. 7, there always will be two oppositely opposed wall sections 31, 51 that will contact the undersurface of panel 4 to thus clamp both panels 3 and 4 together. The axial length of the tubular member 70 functions as a stop limiting element by contacting either the inner surface of the accessory element 8 mounted on panel 3 or the head of the screw 7 to prevent the wall sections 31, 51 from being collapsed to too great a degree. The screw 7 may be withdrawn and the nut will stay in place for subsequent reuse.

Second Embodiment

Figure 11:
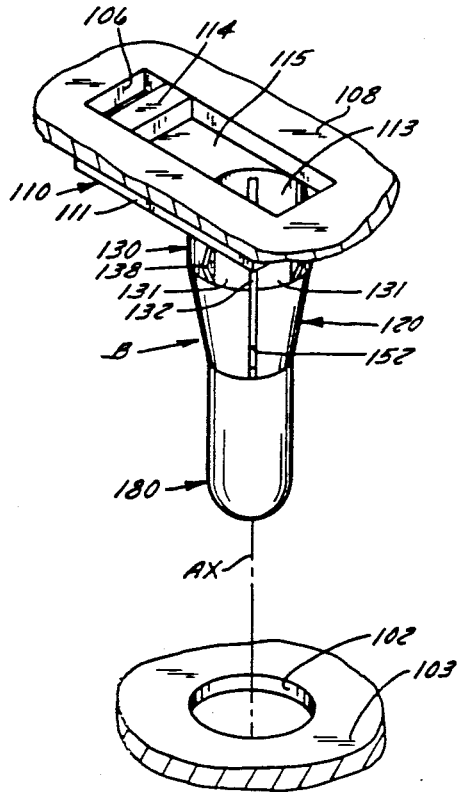
FIG. 11 is an isometric projection view of the nut shown in FIG. 8.

A second embodiment of the expansion nut is identified by the reference character B and is shown in FIGS. 8-13. The second embodiment B of the expansion nut is essentially similar in construction and operation to that of the first embodiment and is designed to be installed in a circular opening 102 (FIG. 11). Embodiment B therefore features a shank portion that is circular in cross section relative to the axis AX of the body.

The nut B comprises a head 110 and an axially extending body 120. The head 110 includes an enlarged flange 111 having an inner surface 112 for engaging a panel member 103, FIG. 12, when installed and a central opening 113 through which a screw 107 can pass when the nut is in use.

The body 120 includes a shank 130 which is connected to the flange 110. The shank 130 is circular in cross section rather than square in cross section, as is the case with nut A of the first embodiment. Shank 130 comprises a plurality of individual upper wall sections 131 separated by axially extending upper slots 132. The upper walls sections 131 are arcuate rather than flat as is the case with the upper wall sections 31 of nut A of the first embodiment. The upper wall sections 131 each have outer and inner surfaces 133 and 134 parallel to the axis AX. The inner surfaces 134 define a shank cavity 135. Each of the upper wall sections 131 have a distal end 136 remote from the flange 111. The distal end 136 establishes a first fold line 137. Crush ribs 138 may be provided on the upper wall sections 131.

The nut B also includes a tapered portion 150 composed of a plurality of individual tapered arcuate wall sections 151 which are separated by axially extending lower slots 152, each of which is aligned with a corresponding one of the upper slots 132. Each of the tapered wall sections has an upper end 155 connected to the distal end 136 of an adjacent upper wall section 131. Each of the tapered wall sections 151 also has a lower end 156 and an inner surface 154 that coacts with the inner surfaces of adjacent lower wall sections to define a lower cavity 157, as will be more fully described hereinafter. The lower wall inner surfaces 154 terminate at a medial portion 158 in the lower cavity 157 between the upper and lower ends 155 and 156. The medial portion 158 establishes a second fold line 159, best seen in FIG. 13.

The body also includes a tubular member 170 extending upward into the lower cavity 157 from the medial portion. The tubular member has exterior and interior wall surfaces 173, 174 extending parallel to the axis AX to define an axially extending first bore portion 175 that is axially aligned with the central opening 113. The tubular member 170 extends from the medial portion 158 toward the head 110 and terminates at the distal end 136 of the shank 130. The tubular member exterior wall surfaces 173 and the tapered wall inner surfaces 154 define a lower cavity 157 that is cone shaped having a circular base at the first fold line 137 and a circular apex at the second fold line 159.

The nut B of the second embodiment also includes an insertion end 180 that is molded integral with the tapered portion 150 and extends axially away from the lower end 156 thereof. The insertion end has uninterrupted outside and inside wall surfaces 183, 184 extending parallel to the axis AX. The inside wall 184 defines a second bore 185 in axial alignment with the first bore 175 and the central opening 113.

The nut B of the second embodiment is adapted to be inserted in a circular aperture 102 of a panel 103, as shown in FIG. 11. When the shank 130 is inserted in a circular aperture, the nut will have a tendency to rotate when screw 107 is threaded into tubular member 170. An antirotation member 114 in the form of a projection is mounted to protrude from the upper surface 115 of the flange member 111 for coaction with an overlying accessory element or panel 108. While the antirotation member 114 could take any shape, it is particularly advantageous to make it rectangular in shape, as in many installations the overlying accessory element or top panel element 108 will have an elongated slot 106 as shown in FIG. 11 having a width dimensioned to receive both the screw 107 and the antirotation member 114.

Figure 13:
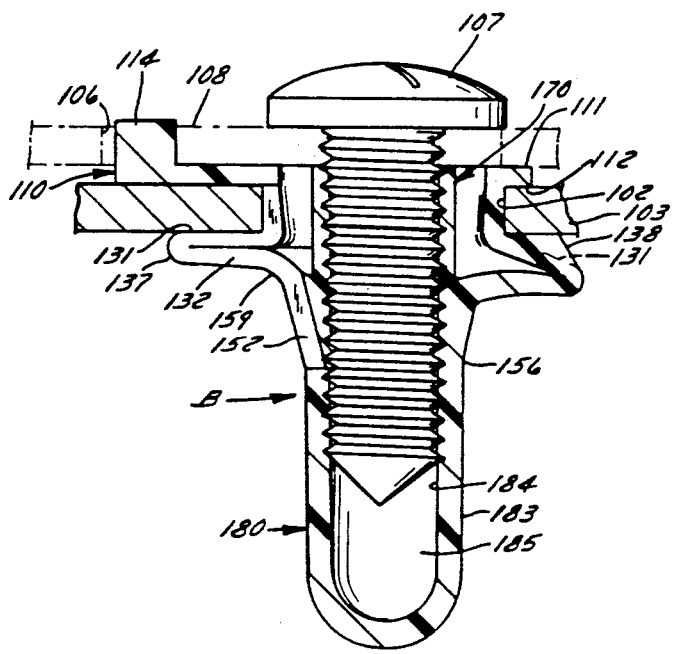
FIG. 13 is a sectional view similar to FIG. 12 taken along line 13—13 of FIG. 9 and showing the nut in a finally installed position in a panel.

The nut B of the second embodiment is installed in the same manner as nut A of the first embodiment. Referring to FIGS. 11, 12 and 13, the nut B is inserted into aperture 102. Flange 111 overlies the top surface of panel 103 and the antirotation member 114 projects upwardly. The accessory element or top panel element 108 is placed in overlying relationship with the antirotation member projecting upwardly into the slot 106, as shown in FIG. 11. The screw member 107 is threaded into bores 175, 185 and tightened. When the head of the screw 106 contacts the exterior surface of the outer element 108, further rotation will cause the insertion end 180 to be drawn upward toward the head 110 of the nut, as shown in FIG. 13. As this occurs, the upper and lower wall sections will collapse and fold along the first and second fold lines 137, 159, as shown in FIG. 13. When installation is complete, the upper wall sections 131 will be in clamping engagement with the undersurface of the inner panel 103 to tightly hold the nut in place and secure any element 108 that is to be fastened to the panel 103.

Third Embodiment

Figure 14:
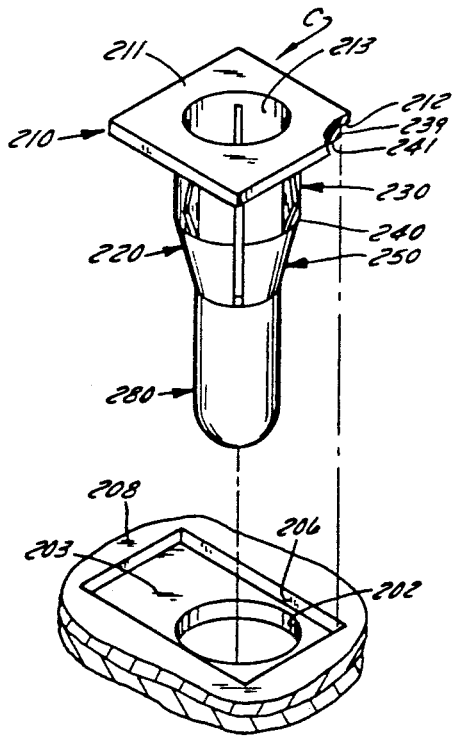
FIG. 14 is an isometric projection view of a third embodiment of the expansion nut.

The third embodiment shows an expansion nut C which is similar in construction to embodiment B but which is adapted to be installed in a slot 206 overlying a circular opening 202, as shown in FIG. 14. Expansion nut C includes a head 210 having a flange portion 211 presenting an inner surface 212 and a central opening 213.

The nut C also includes a body 220 comprising a shank 230, a tapered portion 250, a tubular member (not shown in FIG. 14 but identical to tubular member 170 of embodiment B), and an insertion end 280. The tapered portion 250, the tubular member and the insertion end 280 have a construction which is the same as their counterparts 150, 170, 180 in nut B of the second embodiment. The shank portion 230 of fastener C differs in that it comprises an upper segmentor part 239 and a lower segmentor part 240. The lower part 240 of the shank is constructed the same as its counterpart shank 130 and will not be further described.

The upper part 239 of shank 230 of the third embodiment C comprises an antirotation member 241 that is square in shape and depends from the inner surface 212 of head 210. The antirotation member 241 of the third embodiment, as shown in FIG. 14, is dimensioned to fit snugly into slot 206 of element 208.

In use, the nut C of the third embodiment is installed and functions in substantially the same manner as described hereinabove with regard to the first embodiment. When inserted in the aperture 202, the antirotation member 241 of shank 230 will fit into slot 206 to prevent rotation of the nut when threading a screw therein. Tightening of the screw will draw the insertion end 280 towards the flange to collapse the upper and tapered wall sections, as discussed hereinbefore with regard to nut B of the second embodiment.

In all three embodiments the separation line for the upper and lower halves of a single straight-line open and close mold will, for example, lie either at lower surface 12 or the upper surface 15 of nut head 10. Preferably the mold separation line will lie at the lower surface 12 to place the head cavity in the upper half of the mold. The upper part of the mold is very simple in construction, including the head cavity and a center core pin all with axially aligned surfaces to allow straight-line axial withdrawal during molding. Because the upper part of the mold is low in cost, the design of the present nut permits any number of upper molds to be made, each having a different configuration of a nut head mold cavity therein. The upper molds are each interchangeably usable with the same lower mold. For example, the location, shape and size of antirotation member 114 can easily be varied to accommodate specific application needs. Therefore, nuts B and C of the second and third embodiments can be produced using the same lower half mold.

Crush ribs 38 are frequently desired to prevent the nut from falling out of an overhead panel when it is initially installed in an aperture. If crush ribs 38 are provided on the nut body they will not interfere with the straight-line action of the mold. The top half of the mold containing the center core pin is withdrawn first and then the molded nut is pushed out of the lower half of the mold. The nut is made of plastic which is resilient and will deflect slightly during ejection to accommodate passage of the ribs from the lower half of the mold.

What is claimed is:

1. A universally self-aligning expandable nut for removable mounting in a panel hole defined by a single hole in a single panel, or aligned holes in a plurality of over laid panels comprising a head and a body having a longitudinal axis, said expandable nut being moldable in a simple mold of the type requiring only a straight-line opening and closing mold release action:

said head including an enlarged flange having an inner surface for engaging said panel and a central opening through which a screw can pass when the nut is in use;

said body including, a shank connected to said flange comprised of a plurality of transversely opposed pairs of individual upper wall sections separated by axially extending upper slots, said upper wall sections each having outer and inner surfaces parallel to said axis defining a shank cavity with each of said upper wall sections having a distal end remote from said flange that establishes a first fold line;

a tapered portion composed of a plurality of transversely opposed pairs of individual tapered wall sections separated by axially extending lower slots each of which is aligned with a corresponding one of said upper slots, each of said tapered wall sections having an upper end connected to said distal end of an adjacent upper wall section, a lower end, and an inner surface that coacts with inner surfaces of adjacent lower wall sections to define a lower cavity, said lower wall inner surfaces terminating at a medial portion in said lower cavity between said upper and lower ends that establishes a second fold line;

a tubular member extending upward into said lower cavity from said medial portion and having uninterrupted exterior and interior wall surfaces extending parallel to said axis to define an axially extending first bore axially aligned with said central opening; and an insertion end extending axially away from said lower end and having uninterrupted outside and inside wall surfaces extending parallel to said axis, said inside wall defining a second bore axially aligned with said first bore and said central opening.

2. The expandable nut according to claim 1 wherein said tubular member extends from said medial portion toward said head and terminates at said distal end first fold line of said shank and said tapered wall sections comprise four wall sections in spaced surrounding relation to said tubular member.

3. The expandable nut according to claim 1 wherein said tubular member exterior wall surfaces and said tapered wall inner surfaces define a pyramid lower cavity having a circular apex at said second fold line of said medial portion.

4. The expandable nut according to claim 1 wherein said shank is square in cross section relative to said axis.

5. The expandable nut according to claim 1 wherein said shank is circular in cross section relative to said axis.

6. The expandable nut according to claim 5 wherein said shank comprises upper and lower segments, said upper segment being square in cross section and said lower segment being circular in cross section.

7. The expandable nut according to claim 5 wherein said flange has an upper surface opposite said shank, and an antirotation member that projects axially away from said upper surface.

8. A universally self-aligning expandable nut for removable mounting in a panel hole defined by a single hole in a single panel, or a plurality of aligned holes in a plurality of panels comprising a head and a body having a longitudinal axis, said expandable nut being moldable in a simple mold of the type requiring only a straight-line open and close mold release action:

said head including an enlarged flange having an inner surface for engaging said panel and a central opening through which a screw can pass when the nut is in use;

said body including, a shank connected to said flange comprised of a plurality of individual upper walls circumferentially spaced to encompass said axis in radially spaced relation thereto and separated by axially extending upper slots, said upper walls having inner and outer surfaces parallel to said axis defining a shank cavity with each of said upper walls having a distal end remote from said flange that establishes a first fold line;

a tapered portion comprised of a plurality of individual tapered wall sections circumferentially spaced to encompass said axis in radially spaced relation thereto and separated by axially extending lower slots each of said upper slots, each of said tapered walls having an upper end connected to said distal end of an adjacent upper wall section, a lower end, and an inner surface that coacts with inner surfaces of adjacent lower walls to define a lower cavity, said lower wall inner surfaces terminating at a medial portion in said lower cavity between said upper and lower end that established a second fold line;

a first bore in said tapered portion axially aligned with said central opening; and an insertion end extending axially away from said lower end and having an uninterrupted outside and inside wall surfaces extending parallel to said axis, said inside wall defining a second bore axially aligned with said first bore and said central opening.

9. The expandable nut according to claim 8 wherein said tapered portion has a tubular member extending from said medial portion toward said head, said tubular member terminating at said distal end first fold line of said shank.

10. The expandable nut according to claim 8 wherein said tubular member exterior wall surfaces and said tapered wall inner surfaces define a cone shaped recess having an apex at said second fold line of said medial portion.

11. The expandable nut according to claim 8 wherein said shank is square in cross section relative to said axis.

12. The expandable nut according to claim 8 wherein said shank is circular in cross section relative to said axis.

* * * * *